ABSTRACT OF THE DISCLOSURE

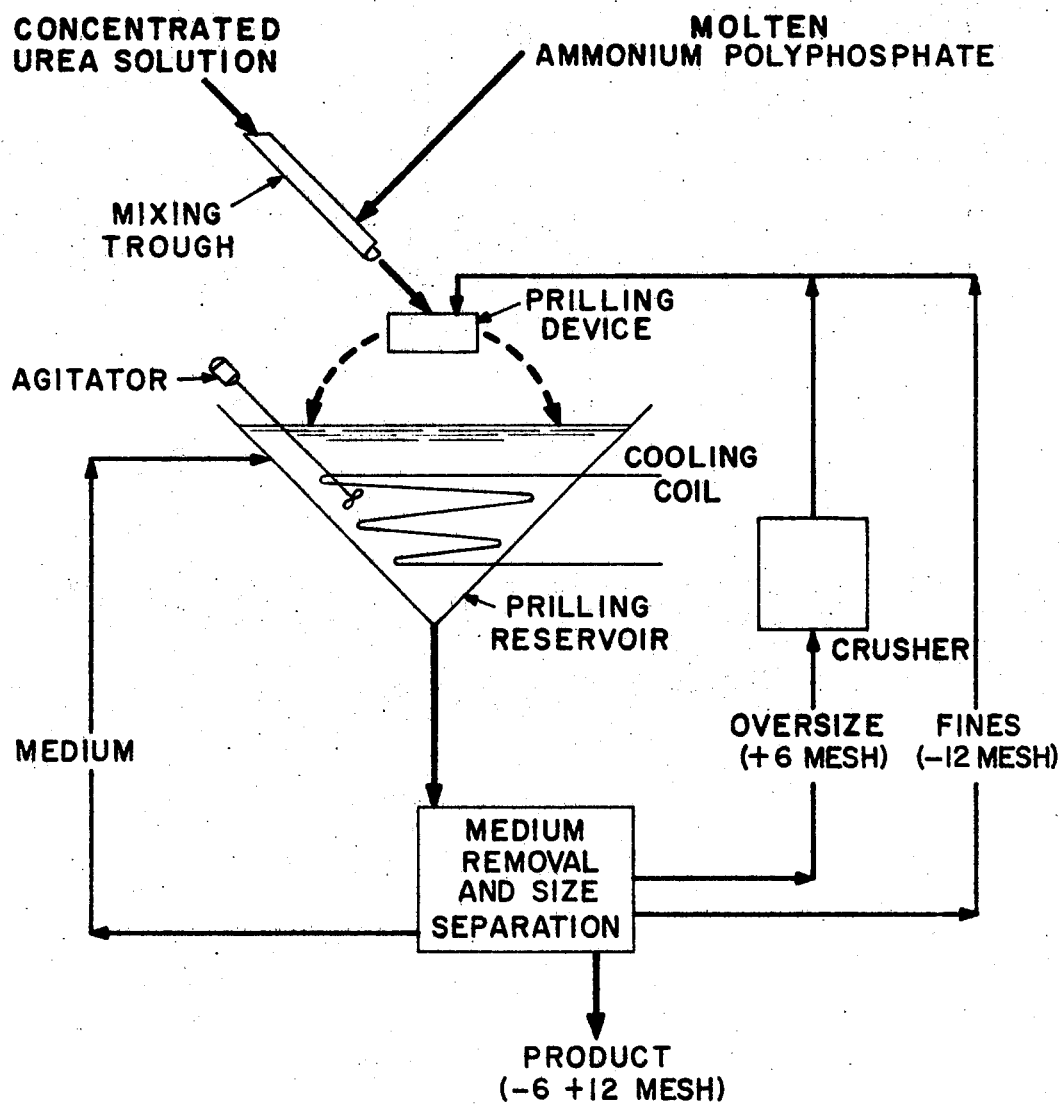
PRODUCTION OF UREA-AMMONIUM POLYPHOSPHATES
BY PRILLING IN LIQUID MEDIUM 3,578,433
METHOD FOR UREA-AMMONIUM POLYPHOSPHATE PRODUCTION
Gabriele A. Bottai, Florence, and John M. Stinson, Sheffield, Ala., assignors to Tennessee Valley Authority
Filed Aug. 5, 1968, Ser. No. 750,277
Int. Cl. C05b 1/00
U.S. Cl. 71—1
7 Claims

Prilling processes for the production of high-analysis fertilizers composed of urea and ammonium polyphosphate which involve combining concentrated urea solution with molten ammonium polyphosphate, forming droplets of said mixtures, and solidifying said droplets by allowing them to fall through liquid medium. Alternatively, product fines and crushed oversize or supplemental fertilizer materials such as potassium chloride or micronutrient sources may be incorporated prior to droplet formation.

---

The invention herein described may be manufactured and used by or for the Government for governmental purposes without the payment to us of any royalty therefor.

Our invention relates to a newly developed process for the production of urea-ammonium polyphosphate prills, more particularly to the prilling of a molten mixture of ammonium polyphosphate and urea in liquid medium, still more particularly to the production of prilled urea-ammonium polyphosphate in liquid medium wherein the resulting product is in a highly crystallized form eminently suited for either short-term or long-term storage, and even still more particularly to a newly developed process for the production of urea-ammonium polyphosphate in highly crystallized form by prilling a molten mixture of ammonium polyphosphate and urea in a liquid medium without the heretofore required application of substantial mechanical shear energy necessary to effect crystallization of ammonium polyphosphate from the melt phase.

Although urea-ammonium polyphosphate fertilizers lend themselves to a great variety of grades, many of which are higher in nitrogen than generally heretofore obtainable, it has been found that in order to obtain urea-ammonium polyphosphate fertilizer material in a form well suited for storage and handling, it is necessary to have the product in a highly crystallized form rather than in amorphous form, which amorphous form has poor handling and storage properties.

Heretofore, one way to make crystalline urea-ammonium polyphosphate is to add solid urea to molten ammonium polyphosphate and to granulate the mixture. It has been found necessary to provide mechanical shear energy through the means of agitation during the granulation step to promote crystallization and thereby obtain a product hard enough to withstand handling. Excellent results are obtained in a pugmill since the kneading action provides the mechanical shear energy which in turn promotes rapid crystallization. The mechanical tumbling action of a pan granulator or rotary drum is less satisfactory. If granulation is carried out in a pan granulator, rotary drum, pugmill, or similar equipment, however, a high proportion of recycled product fines are needed to assist in cooling the mass below its solidification temperature. Preferably then the urea is added in the more expensive solid form since with aqueous solutions of urea the proportion of recycle required is still higher and results in excessively high equipment costs.

We have developed a new process for the production of urea-ammonium polyphosphate material wherein the heretofore required mechanical kneading action described above is completely eliminated; wherein the previous requirement for the use of the more expensive solid form of urea is dispensed with; and wherein the previous very high recycle requirements resulting in excessively high equipment cost is substantially reduced and at the same time the use of recycle is utilized in a new and novel way to actually enhance our new process.

As noted above, our newly developed process revolves about the production of urea-ammonium polyphosphate by prilling a molten mixture of ammonium polyphosphate and urea in a liquid medium. A survey of the literature has revealed four patents pertaining to prilling in oil or other medium. Hallie and Hoogendonk of Stamicarbon, N.V., in a U.S. Pat. (2,793,398, issued May 28, 1957), described the prilling of urea in oil containing a modifier such as paraffin or stearic acid. Stamicarbon has a British patent (No. 794,855, issued May 14, 1958) on a process for granulating droplets of unspecified material by allowing them to fall through a liquid medium in which seeding material is suspended so as to contact the drops during their descent. Stamicarbon also has a patent (U.S. 3,056,-671, issued Oct. 2, 1962) on a process for prilling calcium nitrate to which strontium nitrate was added and the mixture heated to form calcium nitrate crystals prior to the prilling. Badische Anilin- und Soda-Fabrik A.G. (Netherlands application 6,514,264, May 12, 1966) teach the spraying of calcium nitrate melt directly into oil.

We have found that ammonium polyphosphate, when processed in the manner described in the patent literature just supra, does not crystallize. This is not particularly unexpected in view of U.S. Pat. 3,336,127, Hignett et al., assigned to the assignee of the present invention, wherein Hignett et al. teach that ammonium polyphosphate produced from the ammoniation of either wet-process or electric-furnace superphosphoric acid, or mixtures thereof, require substantial amounts of mechanical shear energy in order to drive the molten ammonium polyphosphate mass to a final equilibrium such that when the mass is solidified the product therefrom is a material which is highly crystallized and which will not, upon subsequent storage in bags or the like, change phases with the resulting setting up of the material in storage so as to deleteriously affect its use by the ultimate consumer—the farmer.

In our early work we found that the material formed on the prilling in oil of ammonium polyphosphate melt (14.9–61.5–0 grade; 54% of $P_2O_5$ as polyphosphate; 375° F.) prepared with electric-furnace acid was sticky and uncrystallized. An agglomerated mass formed in the bottom of the prilling reservoir and separation of the individual prills was not possible. Also, unsatisfactory results were obtained when streams of ammonium polyphosphate melt and urea solution were added directly and separately to the prilling device. A homogeneous product was not obtained; instead it was composed of prills of urea and masses of uncrystallized ammonium polyphosphate.

Our invention is based on the discovery that the just previously related woes and pitfalls of trying to prill urea-ammonium polyphosphate material can be completely overcome when, and only when, the streams of ammonium polyphosphate melt and urea solution are mixed together under certain later specified conditions just prior to the actual prilling operation. When this was properly done, we were able to obtain well crystallized and homogeneous products which had excellent handling properties. Seeding materials are not added to the liquid medium in our process and are not necessary in our process for the production of materials with excellent handling properties. Unlike other methods proposed for granulation of urea-ammonium polyphosphates (such as pugmills, etc.), we have discovered that recycled fines are not required in our process. However, we have also found that small amounts of product fines can be added to the melt, if desired, with a resultant increase in fresh granule strength. The incorporation of product fines in this manner is a convenient way to reduce the temperature of the melts to the level desired for prilling and to reprocess undersized material and crushed oversize material. The mixing step referred to above consisted of a combination of the two streams of raw materials into a mixing vessel prior to introduction of same into the prilling device. However, care must be exercised in the mixing to avoid long retention times and high temperatures with accompanying urea hydrolysis, biuret formation, and phosphate condensation. Thus, in addition to allowing the use of the less expensive urea solutions and eliminating the excessively high equipment costs otherwise associated therewith, our process also quite unexpectedly eliminates the previous requirement of applying substantial amounts of mechanical shear energy to the material in order to produce same in a highly crystallized form. The proportion of urea to ammonium polyphosphate in our process is kept between a ratio of 85:15 to 25:75. The higher ratio of 85 pounds of urea to 15 pounds of ammonium polyphosphate results in a product with an $N-P_2O_5-K_2O$ ratio of 4-1-0, which is about the highest N to $P_2O_5$ ratio practical in a fertilizer. At ratios of urea to ammonium polyphosphate less than 25:75 well-crystallized products are not obtained by our process. Just why and how our newly discovered process works is at the present time unexplainable, particularly in view of the teachings of our associates in Hignett et al. 3,336,127, supra.

It is therefore an object of the present invention to produce prills of highly crystallized urea-ammonium polyphosphate which are in phase equilibrium and which therefore have excellent handling and storage properties.

Another object of the present invention is to produce prills of highly crystallized urea-ammonium polyphosphate which are in phase equilibrium and which therefore have excellent handling and storage properties by a process wherein the less expensive liquid form of urea may be utilized rather than the more expensive solid form of urea.

Still another object of the present invention is to produce prills of highly crystallized urea-ammonium polyphosphate which are in phase equilibrium and which therefore have excellent handling and storage properties by a process wherein the less expensive liquid form of urea may be utilized rather than the more expensive solid form of urea, and wherein the previous requirement of a high proportion of recycle with resulting excessively high capital investment costs is substantially eliminated.

A further object of the present invention is to produce prills of highly crystallized urea-ammonium polyphosphate which are in phase equilibrium and which therefore have excellent handling and storage properties by a process wherein the less expensive liquid form of urea may be utilized rather than the more expensive solid form of urea, wherein the previous requirement of a high proportion of recycle with resulting excessively high capital investment costs is substantially eliminated, and wherein the further previous requirement of adding substantial amounts of mechanical shear energy thereto is also eliminated.

Still further and more general objects and advantages of the present invention will appear from the more detailed description set forth below, it being understood, however, that this more detailed description is given by way of illustration and explanation only and not by way of limitation since various changes therein may be made by those skilled in the art without departing from the spirit and scope of the present invention.

Our invention, together with further objects and advantages thereof, will be better understood from a consideration of the following description taken in connection with the accompanying drawing in which:

The figure is a flowsheet generally illustrating the principles of our new and novel process which results in the unique urea-ammonium polyphosphate prills having the novel properties mentioned above.

Referring now more specifically to the figure, the phosphoric acid used in our process may be of either the electric-furnace type or wet-process type, or mixtures thereof, and a wide variety of acid concentrations may be used. The main objective of our process is to produce material containing from about 25 percent to about 98 percent of its $P_2O_5$ as polyphosphates. Acid of merchant-grade concentration (50–58 percent $P_2O_5$ with wet-process orthophosphoric acid and 50–69 percent $P_2O_5$ with electric furnace orthophosphoric acid) may be ammoniated by the process shown in U.S. 3,382,059, Getsinger, assigned to the assignee of the present invention. Also, acids in the superphosphoric acid range (68–79 percent $P_2O_5$ with wet-process acid and 72–85 percent $P_2O_5$ with electric-furnace acid) may be ammoniated in a closed vessel at atmospheric or elevated pressures according to Hignett et al. 3,336,127 and the parent patents thereof. Either freshly prepared ammonium polyphosphate melt or ammonium polyphosphate solid may be utilized.

As has been discussed earlier, one of the objects of our process is to provide a means of producing an ammonium polyphosphate containing product without a step involving mechanical working of the melt in order to induce crystallization such as, for example, the action provided by a pugmill. The lower limit of about 25 percent of the $P_2O_5$ as polyphosphate desired in the process was selected since ammonium polyphosphate products of that level and higher have been found to require the working step, i.e., the application of substantial amounts of mechanical shear energy, as described in Hignett et al., supra. Electric-furnace superphosphoric acid of 85 percent $P_2O_5$, which is about the maximum concentration of superphosphoric acid taught possible (see The Canadian Journal of Chemistry, vol. 34, 1956, page 790), contains about 98 percent of its $P_2O_5$ as polyphosphates. Wet-process superphosphoric acid of 79 percent $P_2O_5$ content would contain a similar proportion of its $P_2O_5$ as polyphosphates.

Urea solutions of 97 percent or greater concentration are preferred in our process. However, solutions of somewhat lower concentrations may be utilized if, and only if, a dryer is installed in the process and if the time of the mixing step is kept at a minimum to avoid hydrolysis of the materials. However, since the dryer greatly increases the initial capital investment, we prefer that our urea solutions contain at least 97 percent urea by weight. It should also perhaps be pointed out that solid urea may be used in our process if one desires to pay the considerably higher and premium cost therefor and if the ammonium polyphosphate is applied as a hot melt. However, the great advantages of our process are more fully realized when urea solutions of at least 97 percent concentration are employed. Alternatively, it is possible to utilize solid ammonium polyphosphate with the urea solution.

Following are pertinent points discovered in our work:

(1) While all prills produced could be handled satisfactorily, the hardness of fresh prills made in an oil medium increased with an increase in the urea content. Also, hardness of all grade prills increased on aging. Data on these points from tests made at prilling temperatures of 280° F. to 290° F. and without recycled fines are tabulated below. These products were aged in sealed containers. Materials aged in the open were about 1 to 3 pounds stronger.

| Prill | | Prill condition [1] | | | | Highest centrifuging force possible without caking, grams | | Oil content (percent by weight) after centrifuging prills | |
|---|---|---|---|---|---|---|---|---|---|
| Nominal grade | Urea, percent | As made | 1 day | 1 week | 2-4 weeks | As made | After 1 day | As made | After 1 day |
| 39-13-0 | 75 | A-2 | | A-4 | A-5 | [2] 1,400 | | 0.7 | |
| 36-18-0 | 70 | B-1 | A-3 | A-5 | A-5 | [2] 1,400 | | 0.9 | |
| 30-30-0 | 50 | C<1 | B-3 | A-5 | A-5 | 40 | [2] 1,400 | 1.3 | 0.5 |

[1] A=hard and brittle throughout; B=hard outer shell but plastic center; C=soft outer shell and plastic center. Number is pounds required to crush minus 7 plus 8 mesh prills (average from tests with 10 prills).

[2] Maximum centrifugal force possible in laboratory centrifuge.

(2) Strength of fresh oil-prilled products was increased by adding recycle fines "nuclei" to the urea ammonium polyphosphate melt or to the prilling cup. The addition of such material, although not necessary to the practice of our process, is an effective method of reducing the prilling temperature and reprocessing undersized material and crushed oversize material.

(3) Fresh strength of oil-prilled products may be increased by incorporating micronutrient-containing additives in the melts prior to prilling (see Example III infra).

(4) Strong fresh products may be obtained by incorporating supplemental fertilizer materials, such as ammonium nitrate or potassium chloride, in the melts prior to prilling (see Example III infra).

(5) Other medium than oil may be used satisfactorily. When prilling was done in an oil-formaldehyde mixture, strong fresh prills were produced which had a coating of urea-formaldehyde reaction product. This may give a product with unusually good storage properties.

(6) Wet-process phosphoric acids also may be used satisfactorily. A 36-12-0 grade product was obtained in the laboratory studies through use of a solid ammonium polyphosphate of 11-58-0 grade produced earlier in the direct production of ammonium polyphosphate from wet-process orthophosphoric acid. In this test, data from which are tabulated below, the solid ammonium polyphosphate was blended rapidly with hot 99 percent urea solution and then prilled immediately. In the batch-type studies, it appeared that hydrolysis of urea would be more of a problem when wet-process ammonium polyphosphate was used than with material made with electric-furnace acid. However, the hydrolysis would not be a serious problem with wet-process acid type products in continuous operation where shorter mixing times could be used.

Ammonium polyphosphate:
  Chemical analysis:
    Total N, percent _____ 11.8
    Total $P_2O_5$, percent _____ 58.4
    Polyphosphate $P_2O_5$, percent of total $P_2O_5$   39
    $R_2O_3:P_2O_5$ mole ratio _____ 0.058

Urea solution:
  Concentration, percent urea _____ 99
  Temperature, °F. _____ 320

Prilling conditions:
  Temperature, °F. _____ 240
  Cup rotation speed, r.p.m. _____ 400

Product:
  Chemical analysis:
    Total N, percent _____ 36.3
    $NH_3$–N, percent _____ 2.8
    Total $P_2O_5$, percent _____ 12.2
  $P_2O_5$ distribution, percent of total $P_2O_5$ as—
    Orthophosphate _____ 58
    Pyrophosphate _____ 36
    Tripolyphosphate _____ 6
    More condensed phosphates _____ <0.5
  Available $P_2O_5$, percent of total $P_2O_5$ _____ 99+
  Pounds $NH_3$/unit of $P_2O_5$ _____ 5.5

Condition:[1]
  As made _____ B-2
  After 1 day _____ A-3
  After 1 week _____ A-2

[1] A=hard and brittle throughout; B=hard outer shell but plastic center; C=soft outer shell and plastic center. Number is pounds required to crush −7 +8 mesh prills (average from tests with 10 prills).

In order that those skilled in the art may better understand how the present invention can be practiced, the following examples of processes we have used in the production of prilled urea-ammonium polyphosphate materials employing a liquid quenching medium therefor are given by way of illustration and not by way of limitation. It should also be noted that the following Examples I-V follow closely the chronological order of development of our new and unique process, and we have incorporated therein substantial quantities of information in order that all those skilled in the art may be taught fully the results of our labor. Accordingly, therefore, before presenting these examples we have outlined in Table A below the acceptable and preferred ranges of variables of our process which, when taken in conjunction with the figure of our process, will enable practice thereof.

TABLE A

[Production of urea-ammonium polyphosphate by prilling in liquid medium: acceptable and preferred range of variables]

| Variables | Limits | Preferred |
|---|---|---|
| Ammonium polyphosphate: | | |
|   Polyphosphate content, percent of total $P_2O_5$ | 25-98 | 40-80 |
|   Degree of ammoniation, pound $NH_3$/unit of $P_2O_5$ | 2.5-9.5 | 4.0-7.5 |
|   Melt temperature, °F | [1] 270-600 | [1] 300-450 |
| Urea solution: [2] | | |
|   Concentration, percent by weight | 97-100 | 99-99.5 |
|   Temperature, °F | 250-325 | 290-310 |
| Mixer: | | |
|   Temperature, °F | 190-325 | 250-300 |
|   Retention time, minutes | 0.01-2 | 0.01-0.5 |
| Prilling step: | | |
|   Temperature of melt, °F | 190-325 | 250-300 |
|   Retention time in prilling device, minutes | 0.01-2 | 0.01-0.5 |
|   Temperature of prilling medium, °F | 32-175 | 50-125 |
|   Amount of recycled fines added to molten mixture, percent of total product | 0-50 | 10-30 |
| Feed material constituent ratios, pounds of urea to pounds of ammonium polyphosphate | 85:15-25:75 | 80:20-50:50 |

[1] Solid ammonium polyphosphate may be used also with urea solution.
[2] Solid urea may be used also with ammonium polyphosphate melt.

While any droplet-forming means would be suitable for use in our process we, for convenience, limited our work to the use of rotating cylindrical cups with holes in their side walls through which the melts were thrown, thus forming the droplets. Also, we envisioned that many types of liquid medium, such as oil of mineral origin, would be suitable for use. However, we again, for convenience, limited ourselves to use of low-cost motor oil and metallurgical grade quenching oil and other mediums listed in Example III, infra.

The product from our process may be advantageously used in a variety of ways to prepare high-analysis liquid fertilizers some of which methods are taught in Hignett et al. 3,336,127, supra.

EXAMPLE I

In this series of tests, the procedure for prilling the urea-ammonium polyphosphates was to combine streams of ammonium polyphosphate melt (280° F.) and 99 percent urea solution (300° F.) in a trough wherein they were mixed without significant mechanical shear energy and from which they flowed into a prilling cup. Droplets of the mixtures (280°–290° F.) were thrown from the cup into an oil bath [1] (SAE No. 10 motor oil) where they were quenched and the prills formed. The ammonium polyphosphate melt was produced in the usual manner in the laboratory continuous-type autoclave by ammoniating electric-furnace superphosphoric acid of 76 percent $P_2O_5$ content at 25 p.s.i.g. As produced, the melt temperature was about 375° F. but in our exploratory small-scale equipment without insulated lines dropped to 280° F. during transfer to the prilling system. The 99 percent urea solution was produced by melting unconditioned urea in a urea melter and adding water.

Two different prilling cups were tested. They consisted of 3-inch-diameter cylinders, 1.5 to 3 inches high, with either forty-nine 3-millimeter-diameter holes or twelve 4-millimeter-diameter holes spaced equally around the side of the cup. The cups were rotated at speeds of 275 to 325 r.p.m. The only operating difficulties encountered were occasional blockages of the holes in the prilling cup. This trouble was eliminated by installing a scraper blade in the cup.

The products were separated from the oil by pumping onto a 20-mesh screen. Portions of the prills were then centrifuged to remove the adhering oil. The products were analyzed and inspected for hardness. During prilling, the oil temperature was in the range of 50° F. to 135° F. Data from the tests are shown in Table I below.

TABLE I.—OIL PRILLING OF UREA-AMMONIUM POLYPHOSPHATE

|  | Urea-ammonium polyphosphate, nominal grade | | |
| --- | --- | --- | --- |
|  | 39-13-0 | 36-18-0 | 30-30-0 |
| Test Number, OP— | 15 | 13B | 12 |
| Feed to prilling apparatus: | | | |
| Urea solution: | | | |
| Rate, grams/minutes | 505 | 309 | 251 |
| Temperature, ° F | 300 | 300 | 300 |
| Retention time in melter,[1] minutes | 3 | 5 | 6 |
| Total N, percent by weight | 46.1 |  | 46.3 |
| $H_2O$ (Karl Fischer), percent by weight | 0.3 |  | 0.2 |
| Ammonium polyphosphate [2]: | | | |
| Rate, grams/minutes | 140 | 185 | 253 |
| Temperature at end of transfer line, ° F | 285 |  | 280 |
| Grade | 15.7-60.2-0 | 16.3-59.1-0 | 15.9-60.4-0 |
| Pound $NH_3$/unit $P_2O_5$ | 6.3 | 6.7 | 6.4 |
| Percent of total $P_2O_5$ as polyphosphate |  | 48 | 50 |
| $H_2O$ (Karl Fischer), percent by weight | 0.2 | 0.5 | 0.1 |
| Urea and ammonium polyphosphate mixed at indicated location before entering prilling cup. | Approximately 6 in. from prilling cup in feed chute to prilling cup | | |
| Operating conditions in prilling apparatus: | | | |
| Prilling cup: | | | |
| Designation [3] (rotational speed, r.p.m.) | A (325) | B (325) | B (275) |
| Temperature, ° F.: | | | |
| Inlet | 290 | 290 | 280 |
| Discharge | 285 |  |  |
| Input grade (calculated) | 39.5-13.0-0 |  | 30.9-30.4-0 |
| Oil reservoir: | | | |
| Oil used: | | | |
| Type | SAE Number 10 motor oil | | |
| Temperature, ° F. (start-finish) | 90-135 | 50 | 65-100 |
| Volume, gallons | 50 | 5 | 50 |
| Depth, inches | 13 | 10 | 10 |
| Prilled product (after centrifuging): | | | |
| Composition, percent by weight: | | | |
| Urea | 75 | 70 | 45 |
| Total N | 38.7 | 37.6 | 28.7 |
| Total $P_2O_5$ | 13.9 | 16.1 | 31.9 |
| $H_2O$ (Karl Fischer) | 0.9 | 0.7 | 0.7 |
| Pounds free $NH_3$/unit $P_2O_5$ | 6.0 |  | 5.9 |
| Pounds urea/100 lb. $P_2O_5$ | 537 | 437 | 140 |
| Percent of total $P_2O_5$ as: | | | |
| Orthophosphate | 53 | 50 | 50 |
| Polyphosphate | 47 | 50 | 50 |
| Screen analysis (Tyler series), percent by weight: | | | |
| +6 mesh | 17 |  | 8 |
| −6 +12 mesh | 73 |  | 84 |
| −12 mesh | 10 |  | 8 |

[1] Prilled unconditioned urea (46.5% N, 0.4% biuret, 0.2% Karl Fischer $H_2O$) and water fed to 4-inch-dia. by 12-inch-high (1,250-ml. effective volume) tank-type melter equipped with an agitator.

[2] Produced in 1-gal. autoclave reactor at 25 p.s.i.g., 375° F., and 17 to 31-minute retention time.

[3] A=1.5- by 3-inch-dia. cylinder with 49 3-mm. holes; B=3- by 3-inch-dia. cylinder with 12 4-mm.-dia. holes.

The grades of the products were 38–13–0 (75 percent urea), 37–16–0 (70 percent urea), and 28–31–0 (45 percent urea). The proportion of $P_2O_5$ in polyphosphate form (47–50 percent of total $P_2O_5$) was close to that in the ammonium polyphosphate melt. The extent of hydrolysis of urea during the prilling operation was not measured, but was thought that little hydrolysis occurred since no odor of ammonia was noticed. Also, in other tests made at this time, less than 1 percent urea hydrolysis occurred when mixtures of urea and ammonium polyphosphate were held for one-half minute in a small mixer-cooler at a similar temperature (280°–290° F.).

No deformation of any of the prills was noted during pumping of the oil-prill mixture for separation of the oil. Freshly made prills of 38–13–0 and 37–16–0 grades did not pack (cake) in the centrifuge at a force of 1400 times the force of gravity (1400 G), whereas the 28–31–0 prills could be centrifuged at a force of only 40 G. The latter prills, when fresh, were observed to be much softer and plastic. All products, however, got harder on storage in air, and after the 28–31–0 grade material had aged for 1–3 days, it could be centrifuged at a force of 1400 G

---

[1] Either a 3-foot-diameter by 16-inch-high pan filled with 10–13 inches of oil or a 5-gallon can filled with 10 inches of oil.

without packing in the centrifuge. After aging for 2 to 4 weeks, all prills of urea-ammonium polyphosphate were extremely hard throughout. They were of about the same strength as granules of ammonium polyphosphate of the same size prepared several months earlier in the demonstration plant.

High proportions (73 to 84 percent) of the products were obtained in the minus 6- plus 12-mesh size range. In tests made on the effect of centrifuging conditions on the amount of deoiling accomplished, minus 6- plus 12-mesh prills of 28–31–0 grade (produced in oil at 65°–100° F.) contained only 0.1 percent by weight of oil after centrifuging for 10 minutes at 1400 G. Fresh prills of 38–13–0 grade produced at an oil temperature of 90° to 135° F. contained more oil, 0.7 percent at 1400 G and 1.4 percent at 250 G (see tabulation below), but were not oily in appearance. Other tests with 38–13–0 material showed that the oil content increased with a decrease in prill size.

38-13-0 urea-ammonium polyphosphate

| Maximum centrifugal force,[1] G | Prill size, mesh (Tyler series) | Oil content, percent by weight |
|---|---|---|
| Effect of centrifugal force: | | |
| 250 | −6+10 | 1.4 |
| 825 | −6+10 | 0.8 |
| 1,400 | −6+10 | 0.7 |
| Effect of prill size: | | |
| 1,400 | +6 | 0.5 |
| 1,400 | −6+10 | 0.7 |
| 1,400 | −10+12 | 1.1 |
| 1,400 | −12 | 1.1 |

[1] Force at outer edge of basket. Force at inner edge only 60% of this value.

EXAMPLE II

In this series of tests, studies were continued from Example I above on the production of urea-ammonium polyphosphates by oil prilling mixtures of 99 percent urea solution and molten ammonium polyphosphate. Also, a new prilling oil reservoir was constructed to improve handling of the prills. The flat-bottom oil reservoir (3-ft. dia. by 16-in. high) was replaced with one that was shaped like an inverted cone so that the prills would settle to a central location and manual handling would not be required to transfer them to the oil-drainage screen. The sides of the cone arbitrarily were fabricatd at 45 degrees; the diameter at the top of the cone was 5 feet and the diameter at the bottom was 1½ inches. In these tests, the reservoir was operated with SAE No. 10 motor oil up to the 4-foot-diameter level (85 gal. of oil). Agitation of the oil was accomplished with a single-shaft agitator equipped with four turbines. Prills and oil were pumped continuously from the bottom of the cone to 12-mesh screens; the oil drained by gravity from the prills and flowed back into the reservoir.

In tests made in Example I supra, prills of 39–13–0 and 36–18–0 nominal grades were hard and could be centrifuged when fresh at a force of 1400 G, the maximum attainable in the laboratory centrifuge. Prills of 30–30–0 nominal grade, however, were somewhat weaker; although they did not deform when the prill-oil mixture was pumped to the oil-drainage screen, they caked in the centrifuge basket when centrifuged at a force in excess of 40 G. Also, minus 7- plus 8-mesh fresh prills of this grade flattened when subjected to a force of about 1 pound in an arbitrary prill-strength measurement test. All three grades of prills, however, became significantly harder when aged for several days.

These tests were made with a view toward increasing the strength of the 30–30–0 granules by adding recycle fines "nuclei" to the urea-ammonium polyphosphate melt before it flowed to the prilling cup. In these tests, the ammonium polyphosphate reactor, the urea melter, and the prilling system were operated as described in Example I supra; however, in addition, the recycle fines (−12 mesh from a previous test) were fed to the top of the urea-ammonium polyphosphate mixing trough (6 in. long) and the entire mixture flowed to the prilling cup. Little remelting of the fines would occur by adding them at this location and they would act as hard nuclei around which the new prills would form. In this manner, it was thought that stronger prills would be produced which were capable of being centrifuged at higher forces than materials produced without fines.

Data from one of the tests with the addition of fines are shown in Table II infra along with data from a previous test at similar operating conditions but without fines. The prilling temperature in the test without fines was 280° F. A higher temperature, 300° F., was used in the test with fines because of the necessity of having hotter ammonium polyphosphate melt entering the chute (330° vs. 300° F.) to prevent buildup of fines on the chute. One pound of fines was added for each 5 pounds of melt. This proportion of fines is equivalent to the amount of plus 6-mesh and minus 12-mesh material produced in earlier tests.

No difficulties were encountered in the prilling of melts containing recycle fines and 77 percent of the final product was in the desired size range of minus 7 plus 12-mesh. The incorporation of the fines improved the physical properties of the freshly made prills; they had a hard outer shell and those of minus 7- plus 8-mesh size could stand a pressure of 2 pounds as compared with about 1 pound for prills made without fines. As with prills made in previous tests, strength increased with aging. Data on the strength of prills when fresh and when stored in a sealed container for various periods of time are shown in the following tabulation.

| Prills seeded with fines | Highest centrifugal force without caking, G | Prill condition [1] | | | | |
|---|---|---|---|---|---|---|
| | | As made | 1 day | 3 days | 1 week | 2 weeks |
| No | 40 | C-1 | C-1.5 | B-3 | A-3 | A-3 |
| Yes | 350 | B-2 | B-4 | B-4 | A-4.5 | A-5 |

[1] A=Hard and brittle throughout; B=Hard outer shell but plastic center; C=Soft outer shell and plastic center. Number is average poundage required to crush ten −7 +8 mesh prills.

After 1 day of storage in the containers, the minus 7- plus 8-mesh prills made with fines could stand a pressure of 4 pounds; their crushing strength increased to 5 pounds after 2 weeks of storage. Prills in this size range made without fines could stand pressures of only 1.5 pounds after storage for 1 day; on further storage that crushing strength did not become greater than 3 pounds. Other tests indicated that prill strength of both materials could be increased by storing them in open air.

Prill strength tests of minus 7- plus 8-mesh fractions of aged commercial prills of urea from four different companies indicated average granule strengths of 2, 2.5, 4, and 4.5 pounds. As in the case with urea-ammonium polyphosphates, smaller sized granules were weaker.

TABLE II

[Oil prilling of urea-ammonium polyphosphate: incorporation of fines in 30–30–0 grade prills]

| | Test No. | |
|---|---|---|
| | OP-18 | OP-21A |
| Fines added, percent of urea, plus ammonium polyphosphate fed | None | [1] 20 |
| Feed to prilling apparatus: | | |
| Urea solution: | | |
| Rate, g./min | 248 | 255 |
| Temperature, ° F | 300 | 300 |
| Retention time in melter,[2] min | 6 | 6 |
| Total N, percent by wt | 45.6 | 46.2 |
| H₂O (Karl Fischer), percent by weight | 0.5 | 0.4 |
| Ammonium polyphosphate:[3] | | |
| Rate, g./min | 250 | 255 |
| Temp. at end of transfer line, ° F | 290 | 320 |
| Grade | 15.4-59.3-0 | 15.5-60.2-0 |
| Lb. NH₃/unit P₂O₅ | 6.3 | 6.2 |
| Percent of total P₂O₅ as polyphosphate | 44 | 40 |
| H₂O (Karl Fischer), percent by wt | 0.1 | |

Footnotes at end of table.

TABLE II—Continued

| | Test No. | |
|---|---|---|
| | OP-18 | OP-21A |
| Urea and ammonium polyphosphate mixed at indicated location before entering prilling cup | (4) | (4) |
| Operating conditions in prilling apparatus: | | |
| Prilling cup: [5] | | |
| Rotational speed, r.p.m | 400 | 590 |
| Temperature, °F.: | | |
| Inlet | 290 | 310 |
| Discharge | 280 | 300 |
| Input grade (calculated) | 30.3-29.8-0 | 30.7-29.9-0 |
| Oil reservoir, oil used: | | |
| Type | (6) | (6) |
| Temperature, °F. (start-finish) | 80-86 | 75-90 |
| Volume, gal | 50 | 65 |
| Depth, in. (at center) | 12 | 22 |
| Prilled product (after centrifuging): | | |
| Composition, percent by weight: | | |
| Total N | 30.4 | 30.0 |
| Urea N | 25.4 | 23.0 |
| Total $P_2O_5$ | 28.9 | 30.0 |
| $H_2O$ (Karl Fischer) | 0.5 | 0.4 |
| Percent of total $P_2O_5$ as: | | |
| Orthophosphate | 57 | 47 |
| Polyphosphate | 43 | 53 |
| Percent of total product as urea | 55 | 49 |
| Screen analysis (Tyler series), percent by wt.: | | |
| +6 mesh | 8 | [7] 5 |
| −6 +12 mesh | 79 | [7] 77 |
| −12 mesh | 13 | 18 |

[1] Fines (−12 mesh) were produced during test OP-18 and in similar test made with the same operating conditions.
[2] Prilled unconditioned urea (46.5% N, 0.4% biuret, 0.2% Karl Fischer $H_2O$) and water fed to 4-inch-diameter by 12-inch-high (1,250-ml. effective volume) tank-type melter equipped with an agitator.
[3] Produced in 1-gal. autoclave reactor at 25 p.s.i.g., 375° F., and 17-min. retention time.
[4] Approx. 6 in. from prilling cup in feed chute to prilling cup.
[5] 3-by 3-inch-diameter cylinder with 51 3-mm.-diameter holes.
[6] SAE No. 10 motor oil.
[7] Largest screen size was 7 mesh.

EXAMPLE III

In this series of tests, exploratory laboratory tests were made of the effect of several factors on the physical properties of 30-30-0 grade urea-ammonium phosphate prills as produced. It was desired to produce a stronger prill to allow early centrifuging at a high force. Fresh oil-prilled materials without addition of recycle fines have been weaker than products of higher urea content (crushing strength of 1 lb.) and have caked on centrifuging unless a low centrifugal force was used. After aging for a day, however, the prills were hard and could be centrifuged easily. Tests were made of the effect of adding various materials to the melt on the initial strength of the prills. Also, tests were made of the utilization of mediums other than oil in the production of 39-13-0 grade material. Prills of this grade were quite hard when produced and could be centrifuged without difficulty.

The urea-ammonium polyphosphate melts used in these tests were made by adding minus 20-mesh ammonium polyphosphate to 99 percent urea solution (300° F.).

Other materials, when added, were blended with the ammonium polyphosphate prior to its addition. The resultant molten mixtures were poured into a preheated prilling cup (3-in. dia. by 3-in. high; 117 2-mm. dia. holes spaced evenly over the circumference), which was rotated at a speed of about 400 r.p.m. The droplets of melts fell through air at room temperature (21-inch vertical drop) and were caught in stainless steel pans containing different prilling mediums generally at 75° F. About 500 grams of melt were processed at a time generally and about 25 grams were caught in each prilling medium. The prills were blotted on paper to remove oil.

The quality of the prills was evaluated when fresh and after aging in sealed bottles, by determining their strength by the procedure described in Example II supra. Microscopic examinations were made of products where reactions may occur. No centrifuging tests were carried out.

Additives to melt

In these tests, the urea solution and electric-furnace ammonium polyphosphate (54 percent of $P_2O_5$ as polyphosphate) were combined in proportions to result in prills of about 3-30-0 grade. Various materials, most of which had resulted in some improvement to the storage properties of ammonium polyphosphate in previous work, were combined with the melt immediately prior to prilling in oil. These additives included (1) borax, (2) oxides of zinc and manganese ($Mn_3O_4$), (3) sulfates of zinc, manganese, ferric iron, and magnesium, and (4) copper. The melt temperature used was about the lowest at which the mixtures were fluid. Incorporation of the additives lowered this temperature from 270° F. (no additive) to 230°-260° F. Results of these tests are shown in Table III infra.

Prills made without an additive were similar to those of this grade made earlier in the continuous prilling equipment (Example II). They had a crushing strength of 1 pound when fresh and 6 pounds after aging for 1 to 7 days.

Prills made with additives of manganese oxide (0.2 or 1 percent Mn as $Mn_3O_4$), zinc oxide (1 or 2 percent Zn), or copper (1 percent Cu) were stronger when produced (crushing strengths of 2-3 lb.). However, after aging for a week, they generally were not any stronger than the no-additive material. Products of about the same strength were obtained also with the incorporation of 0.2 percent Mn when the melt temperature was increased to 280° F. to come closer to that used without an additive. So, the beneficial increases in strength likely were obtained because of the additive.

Prills made with the other additives (borax and sulfate salts) were weaker. Chemical analyses of the products indicated little or no condensation of the $P_2O_5$.

TABLE III

[Production of 30-30-0 grade [1] urea-ammonium polyphosphates by oil [2] prilling: effect of oil temperature and additive to melt prior to prilling]

| Type and amount of additive to melt | Melt temperature prior to prilling, °F. | Prill condition [3] | | | Chemical analysis, percent by wt. | | | | Percent of $P_2O_5$ present as polyphosphates |
|---|---|---|---|---|---|---|---|---|---|
| | | As made | After 1 day | After 1 week | Total N | $P_2O_5$ Total | $P_2O_5$ Ortho | Micro-nutrient element | |

Test No. PAP-

Effect of additive

| | | | | | | | | | |
|---|---|---|---|---|---|---|---|---|---|
| 35 None | 270 | C-1 | A-6 | A-6 | 29.6 | 30.8 | 13.4 | | 56 |
| 15 1% B as $Na_2B_4O_7 \cdot 10H_2O$ | 240 | C-<1 | C-<1 | C-<1 | | | | | |
| 17 2% Zn as ZnO | 250 | C-3 | B-4 | A-5 | 28.4 | 29.9 | 13.3 | 2.0 | 56 |
| 16 1% Zn as ZnO | 250 | C-2.5 | B-4 | A-5 | 28.5 | 30.1 | 13.3 | 1.0 | 56 |
| 30 0.3% Zn as ZnO | 260 | C-1 | C-1.5 | A-5 | 30.2 | 30.9 | 13.9 | 0.4 | 55 |
| 23 1% Zn as $ZnSO_4 \cdot 7H_2O$ | 240 | C-<1 | A-2 | A-2 | 29.8 | 27.9 | 13.6 | 0.7 | 51 |
| 24 1% Mn as $Mn_3O_4$ | 250 | C-2 | C-3.5 | A-5 | 29.4 | 31.1 | 14.3 | 1.0 | 54 |
| 25 0.2% Mn as $Mn_3O_4$ | 250 | C-2 | A-3 | A-9.5 | 30.3 | 30.1 | 13.5 | 0.2 | 55 |
| 61 0.2% Mn as $MnSO_4$ | 280 | C-2 | A-3 | A-5 | | | | | |
| 22 1% Mn as $MnSO_4 \cdot H_2O$ | 260 | C-1 | C-2 | A-7 | 29.3 | 29.2 | 12.9 | 0.7 | 56 |
| 26 1% Cu as metallic Cu | 250 | C-2 | A-5 | A-5 | 29.8 | 30.5 | 14.0 | 1.0 | 54 |
| 27 1% Fe as $Fe_2(SO_4)_3 \cdot 9H_2O$ | 230 | C-<1 | B-2 | A-4.5 | | | | | |
| 21 1% Mg as $MgSO_4 \cdot 7H_2O$ | 240 | C-<1 | A-2.5 | A-3 | | | | | |

[1] Formulated analysis, no additive basis. Ammonium polyphosphate (OM-540) incorporated in melt analyzed 14.9% N, 61.5% $P_2O_5$; 54% of the $P_2O_5$ was present as polyphosphate.
[2] SAE 10 weight motor oil: U.S. Navy Specification 2110; temperature, 72°-87° F.
[3] A=hard and brittle throughout; B=hard outer shell but plastic center; C=soft outer shell and plastic center. Number is pounds required to crush −7 +8 mesh prills (average from tests with 10 prills).

Effect of polyphosphate content and potash addition

Results of tests of the production of 30-30-0 grade products by oil prilling mixtures of urea solution and ammonium phosphate melts of various polyphosphate contents are shown in Table IV infra, along with results of tests of the production of 1:1:X ratio materials containing 60 percent of their $P_2O_5$ as polyphosphate. The prilling temperatures used in these tests (260°–280° F.) where about the lowest temperatures at which the mixtures were fluid.

Strong fresh 30-30-0 grade prills (4 lb. crushing strength) were obtained (test PAP-18) with use of ammonium polyphosphate containing 80 percent of its $P_2O_5$ as polyphosphate (produced earlier by ammoniation of electric-furnace acid of 78 percent $P_2O_5$ content) as the phosphate source. Fresh 30-30-0 prills produced with phosphate that contained 33 percent of its $P_2O_5$ as polyphosphate were as strong as those produced earlier from ammonium polyphosphate of about 50 to 60 percent polyphosphate content (1 lb. crushing strength).

Incorporation of reagent-grade potash to give product of 20-20-20 grade (test PAP-60) or of 24-24-12 grade (test PAP-58) and 60 percent of their $P_2O_5$ as polyphosphate also gave fresh prills which were very strong. They had crushing strengths of 4 and 8 pounds, respectively. Supplying only enough potash to give 30-30-4 or 30-30-2 grade products, however, did not result in improvement in fresh prill strength.

agitated constantly during the test. The second consisted of mediums other than oil, which were carbon tetrachloride, kerosene, mineral spirits, ethylene glycol, paraformaldehyde, and a water solution saturated with 39-13-0 grade material. The melt temperature used (270° F.) was about the lowest at which the urea-ammonium polyphosphate melt was fluid. Results of the tests are shown in Table V infra.

Prills made without an additive were similar to those of this grade made earlier in the continuous prilling equipment (Example II supra).

Best results were obtained on prilling into a medium containing 5 percent Formalin solution (37 percent formaldehyde, 12–15 percent methyl alcohol, remainder water) and whose pH was adjusted to 1 by the addition of sulfuric acid. The Formalin was not miscible with the oil so the medium was agitated during the tests. Prills made in this medium had a crushing strength of 5.5 pounds when fresh. They contained 1.2 percent formaldehyde and microscopic examination revealed the presence of a urea-formaldehyde reaction product of unknown composition on the prill surfaces.

Products made with mixtures of oil and n-butyl or isopropyl alcohol were about as strong as prills made in oil alone but those made with methyl alcohol were weaker and smaller possibly because of the lower boiling point of methyl alcohol (149° F. vs. 180° F. and 244° F., respectively, for isopropyl and n-butyl alcohols). Also, very small prills were formed when an acetaldehyde (boiling

TABLE IV

[Production of 1:1:X ratio urea-ammonium polyphosphates by oil prilling:[1] effect of phosphate distribution and potassium chloride addition to melt prior to prilling]

| Test No. PAP- | Analysis of phosphate | | Polyphosphate content, percent of total $P_2O_5$ | Percent KCl added | Melt temperature prior to prilling, °F. | Prill condition[2] | | | Chemical analysis of prills, percent by wt. | | | Percent of total $P_2O_5$ as— | | | | |
|---|---|---|---|---|---|---|---|---|---|---|---|---|---|---|---|---|
| | Percent N | $P_2O_5$ | | | | As made | After— 1 day | After— 1 week | N | $P_2O_5$ | $K_2O$ | Orthophosphate | Total polyphosphate | Pyrophosphate | Tripolyphosphate | More condensed phosphates |
| | | | | | | Tests without KCl | | | | | | | | | | |
| 14 | 15.5 | 59.8 | 33 | 0 | 270 | C-1.5 | A-4 | A-4.5 | 30.3 | 30.3 | | 59 | 41 | 35 | 5 | 1 |
| 35 | 14.9 | 61.9 | 54 | 0 | 270 | C-1 | A-6 | A-6 | 29.3 | 30.8 | | 44 | 56 | | | |
| 18 | 15.5 | 63.0 | [3] 79 | 0 | 260 | B-4 | A-5 | A-5 | 29.3 | 31.0 | | 20 | 80 | 67 | 9 | 4 |
| | | | | | | Tests with KCl | | | | | | | | | | |
| 42 | 14.9 | 61.9 | 54 | 5 | 270 | C-1 | A-4 | A-3 | 29.3 | 30.2 | 1.7 | 44 | 56 | | | |
| 43 | 14.9 | 61.9 | 54 | 11 | 270 | C-2 | B-4 | A-4 | 27.9 | 29.1 | 4.3 | 42 | 58 | | | |
| 58 | 14.9 | 61.9 | 54 | 20 | 270 | A-8 | A-6.5[4] | A-5.5 | 23.9 | 25.2 | 12.3 | 40 | 60 | | | |
| 60 | 14.9 | 61.9 | 54 | 33 | 270 | B-4 | A-8.5 | A-7 | 19.2 | 20.9 | 21.3 | 38 | 62 | | | |

[1] Except as noted small-scale tests made with SAE 10 weight motor oil, U.S. Navy Specification 2110, oil temperatures of 70°–79° F. No fines used
[2] A=hard and brittle throughout; B=hard outer shell but plastic center; C=soft outer shell and plastic center. Number is pounds required to crush—7 +8 mesh prills (average from tests with 10 prills).
[3] 99% of polyphoshate present as pyrophosphate.
[4] 4 days.

Effect of prilling medium

In these tests the urea solution and ammonium polyphosphate with 54 percent of its $P_2O_5$ as polyphosphates were combined in proportions to result in prills of 39-13-0 grade. The prilling mediums used were of two general categories. The first consisted of mixtures of SAE 10 weight oil and additives that could react with the urea; the additives were several alcohols, acetic acid, acetaldehyde, and Formalin solution. Most of these additives were not miscible with the oil and the medium was point of 68° F.) oil mixture was used. Urea-alcohol reaction products are reported in the literature[2] but none were found on microscopic examination of the products made with the alcohols.

Good prills as strong as those made in oil were obtained when carbon tetrachloride, kerosene, and mineral spirits were used as prilling medium. Also, it appeared that it

[2] Seidell, A.: "Solubilities of Organic Compounds," third edition, vol. II, D. Van Nostrand Company, Inc., Princeton, N.J. 1940.

would be possible to remove these mediums easier than the 10 weight oil. Kerosene is less hazardous to use than the carbon tetrachloride or mineral spirits. Also, kerosene is less expensive than the oil or other medium tested.

No prills formed when the prilling mediums were water, ethylene glycol, or a mixture of paraformaldehyde and ammonia (pH 10) saturated with urea-ammonium polyphosphate of 39–13–0 grade.

EXAMPLE IV

In this series of tests, studies were carried out on the production of 30–30–0 grade material in the continuous-type equipment at prilling temperatures of 250° F. to 300° F. The lower temperature was obtained by adding cold recycle fines directly to the prilling cup. This is a convenient way to reduce the temperature of the melt and dispose of undersized product. Also, the incorporation of

TABLE V

[Production of 39–13–0 grade urea-ammonium polyphosphates by prilling: effect of prilling medium [1]]

| Test No. PAP- | Prilling medium | Medium miscible at concentration tested | Prill condition [2] As made | 1 day | 1 week | Comments |
|---|---|---|---|---|---|---|
| 4A | Oil [3] | | B-3.5 | A-6 | A-7 | Good prills. |
| 4C | 10% n-butyl alcohol-oil mixture | Yes | B-2 | A-4 | A-4 | Very small prills. |
| 5E | 10% methyl alcohol-oil mixture | No | C-<1 | C-<1 | C-<1 | Very small porous prills. |
| 9C | 10% isopropyl alcohol-oil mixture | Yes | B-3.5 | A-5 | A-4 | Very small prills. |
| 7C | 10% glacial acetic acid-oil mixture | No | B-3 | B-3 | B-3 | Yellow viscous material on prills. |
| 9E | 10% acetaldehyde-oil mixture | No | | | | Very small, gummy prills. |
| | Formalin solution-oil mixtures: | | | | | |
| 57B | 50% Formalin solution (pH 1) | No | | | | No prills formed. |
| 57C | 25% Formalin solution (pH 1) | No | B-2.5 | A-5 [4] | A-5.5 | Few very small prills. |
| 57D | 5% Formalin solution (pH 1) | No | A-5.5 | A-5.5 [4] | A-5.5 | Good prills. |
| 57E | 5% Formalin solution (pH 4) | No | B-3.5 | A-6 [4] | A-5.5 | Do. |
| 11C | 0.25% Formalin solution (pH 4) | No | A-3 | A-5 | A-4 | Do. |
| 9D | Carbon tetrachloride | | A-3 | A-4.5 | A-3.5 | Small but dry appearing product. |
| 45B | Kerosene | | B-3.5 | A-5 | A-4 | Dry appearing product. |
| 45D | Mineral spirits | | B-3.5 | A-5 | A-4 | Very dry product. |
| 8B | Water saturated with 3:1:0 | Yes | | | | No prills formed. |
| 8D | Ethylene glycol saturated with 3:1:0 | Yes | | | | Do. |
| 11E | Paraformaldehyde plus NH$_4$OH saturated with 3:1:0 (pH 10+) | Yes | | | | Do. |

[1] Prilling temperature was 270° F. and prilling medium temperatures were 70° to 77° F.
[2] A=hard and brittle throughout; B=hard outer shell but plastic center; C=soft outer shell and plastic center. Number is pounds required to crush −7 +8 mesh prills (average from tests with 10 prills).
[3] SAE 10 weight oil (Navy Specification 2110).
[4] 5 days.

Liquid fertilizers from oil-prilled products

Liquid fertilizers of 18–6–0 (pH 6.5) and 17–17–0 (pH 6.1) grades were prepared by mixing 39–13–0 and 30–30–0 products from earlier oil-prilling tests (tests OP–15 and 18) with water. These liquid grades are about the highest of these ratios expected to be soluble at 32° F. As would be expected, the oil present (calculated to be 0.5 and 0.3 percent by weight of the liquid, respectively) floated on the surfaces of the liquids, which were clear.

fines was found previously (Example II) to be advantageous in that it increased the early strength of the prills. The production conditions used in making these tests are described in Table VI below. For comparison, results from the test reported in Example II also are shown; in this latter test (OP–21–A) the fines were added in the chute preceding the prilling cup. The oil temperature in tests 25B and 28B was controlled by circulating water through coils located in the prilling reservoir.

TABLE VI

[Oil prilling of nominal 30–30–0 grade urea-ammonium polyphosphate]

| | Test | | |
|---|---|---|---|
| | OP-21-A [1] | OP-25-B | OP-28-B |
| Feed to prilling apparatus: [2] | | | |
| Urea solution: [3] | | | |
| Rate, g./min | 255 | 236 | 255 |
| Melter: | | | |
| Temperature, ° F | 300 | 300 | 300 |
| Retention time, min | 4 | 4 | 4 |
| Grade | 46.2-0-0 | 46.2-0-0 | 46.4-0-0 |
| H$_2$O (Karl Fischer), percent by wt | 0.4 | 0.3 | 0.3 |
| Ammonium polyphosphate: | | | |
| Rate, g./min | 255 | 236 | 255 |
| Temperature at end of transfer line, ° F | 320 | 310 | 273 |
| Grade | 15.5-60.2-0 | 15.2-60.7-0 | 15.7-61.2-0 |
| Lb. NH$_3$/unit P$_2$O$_5$ | 6.3 | 6.1 | 6.2 |
| Percent of total P$_2$O$_5$ as polyphosphate | 40 | 44 | 50 |
| H$_2$O (Karl Fischer), percent by wt | | | 0.1 |
| Recycle fines: | | | |
| Rate, g./min | 100 | 100 | 100 |
| Grade | | 31.6-26.0-0 | |
| Percent of total P$_2$O$_5$ as polyphosphate | | 49 | |
| H$_2$O (Karl Fischer), percent by wt | | 0.4 | |
| Screen analysis (Tyler series), percent by wt.: | | | |
| +12 mesh | | | 21 |
| −12 +16 mesh | (4) | (4) | 60 |
| −16 mesh | | | 19 |
| Operating conditions in prilling apparatus:[5] | | | |
| Prilling cup: | | | |
| Rotational speed, r.p.m | 600 | 525 | 600 |
| Discharge temperature, ° F | ~300 | 260 | 250 |
| Oil reservoir: | | | |
| Oil depth, in | 22 | 22 | 26 |
| Temperature, ° F. (start-finish) | 65-90 | 74-80 | 84-85 |
| H$_2$O to cooling coils: | | | |
| Gal./min | | | 2.8 |
| Temperature, ° F. (inlet-outlet) | | | 68-73 |
| Prilled product: | | | |
| Composition, percent by wt.: | | | |
| Total N | 30.0 | 30.4 | 2.96 |
| NH$_3$-N | 7.3 | 7.5 | 8.0 |

Footnotes at end of table.

TABLE VI—Continued

|  | Test | | |
| --- | --- | --- | --- |
|  | OP-21-A [1] | OP-25-B | OP-28-B |
| Total P₂O₅ | 30.0 | 29.4 | 30.7 |
| H₂O (Karl Fischer) | 0.4 | 0.8 | 1.0 |
| Oil [6] |  | 1.2 (1,400) | 1.1 (155) |
| Biuret | 1.2 | 1.0 | 1.5 |
| Percent of total P₂O₅ as: |  |  |  |
| Orthophosphate | 47 | 55 | 50 |
| Polyphosphate | 53 | 45 | 50 |
| Percent of prill as ammonium polyphosphate | 50 | 48 | 54 |
| Lb. free NH₃/unit P₂O₅ | 5.9 | 6.2 | 6.3 |
| Screen analysis (Tyler series), percent by wt.: |  |  |  |
| +7 mesh | 5 | 13 | 21 |
| −7 +12 mesh | 77 | 68 | 64 |
| −12 mesh | 18 | 19 | 15 |

[1] Test reported in Example II.
[2] Urea solution and molten ammonium polyphosphate mixed 6 in. from prilling cup in trough. Recycle fines fed directly to cup.
[3] Made from prilled solid urea (46.5% N, 0.7% biuret, 0.1% H₂O) and water.
[4] Essentially all −12 mesh.
[5] Prilling cup was cylindrical shape (3- by 3-in. diameter) with 51 holes (3-mm. diameter) spaced in 3 rows around the cup. Oil reservoir was conical in shape 1½-in. diameter at bottom, 5-ft. diameter at top with sides angled at 45 degrees). Cooling coil was conical shaped and made of 80 linear ft. of ½-in.-diameter tubing.
[6] −7 +12 mesh prills after centrifuging 10 min. at indicated centrifugal force.

The operating procedure used in the first test (OP-25-B) was the same as that described in Example II execpt that fines (generally −12 mesh) were added directly to the prilling cup and the oil-prill mixture was pumped to a vibrating double-deck screen rather than to hand operated screens. In the next test (OP-28-B) the oil-prill mixture was allowed to flow by gravity from the bottom of the reservoir to a trommel where most of the oil was separated from the prills. Gravity flow from the oil reservoir worked well and eliminated the need for a pump. The trommel consisted of a 10-inch-diameter by 24-inch-long perforated cylinder fitted with a 30-mesh screen. It was rotated at a speed of about 50 r.p.m. The oil that was separated from the prills was collected in a vessel and pumped continuously back to the prilling reservoir. The other equipment functioned well except for occasional freezing of the urea-ammonium phosphate mixture on the walls of the prilling cup. This mixture was melted from the cup with a torch.

Reducing the prilling cup discharge temperature from 300° F. to 250°–260° F. while adding fines to the cup did not affect the early strength of the prills. Strength data for prills stored in open containers are shown in the following tabulation. The effects of open versus sealed storage on product strength are discussed in the next section of this example.

|  | Prill cup discharge temperature, °F. | Prill condition [1] | | | | |
| --- | --- | --- | --- | --- | --- | --- |
|  |  | As made | 1 day | 3 days | 1 week | 2 weeks |
| Test No. OP- |  |  |  |  |  |  |
| 21-A | 300 | C-2 | B-4 | A-7 | A-8 | A-7 |
| 25-B | 260 | C-1.2 | A-5 | A-6 | A-8 | A-8 |
| 28-B | 250 | C-1.5 | A-4 | A-5 | A-6 | A-6 |

[1] A=hard and brittle throughout; B=hard outer shell but plastic center; C=soft outer shell and plastic center. Number is average poundage required to crush ten −7 +8 mesh prills.

From 1- to 2-pounds pressure was required to deform the fresh products (grades 30.4–29.4–0 and 29.6–30.7–0). On aging for a day, the crushing strengths increased to 4.5 pounds; on further aging, the strength increased to 6–8 pounds. The prills made at a temperature of 300° F. were well rounded, whereas the largest prills made at 250° to 260° F. were shaped somewhat like tear drops. Prills made previously without fines, at a temperature of about 275° F., were well rounded.

Open versus sealed storage

Prills of 30–30–0 grade, after being centrifuged, have been stored in open and sealed vials at room temperature and their strengths determined over storage periods of up to 1 month. Results from these tests are shown in Table VII below.

During the first 2 weeks after manufacture, the prills generally increased in strength as they aged regardless of whether they were stored in an open or a sealed container. After 2 weeks of storage, the prills stored in open containers were much stronger than those stored in the sealed containers; about 7 pounds' pressure was required to crush the exposed prills while only about 3 pounds' pressure was needed to crush those stored in sealed containers. A slight decrease in prill crushing strength (<1–2 lb.) was noted during the latter 2 weeks of the storage period.

Chemical and microscopic analyses of the stored samples, however, showed little differences. Apparently then, to obtain the hardest 30–30–0 grade prills, it would be better to allow the prills to age in the open prior to bagging rather than bagging immediately after production and allowing the prills to age in the bags.

TABLE VII

[Storage of 30–30–0 urea-ammonium polyphosphates in open and sealed containers [1]]

|  | Test | | | |
| --- | --- | --- | --- | --- |
|  | OP-20-A | | OP-21-A | |
| Composition before storage: |  |  |  |  |
| Analysis, percent by wt.: |  |  |  |  |
| Total N | 30.6 |  | 30.0 |  |
| Total P₂O₅ | 29.7 |  | 30.0 |  |
| H₂O (Karl Fischer) |  |  | 0.4 |  |
| Percent of total P₂O₅ as polyphosphate |  |  | 53 |  |
| Composition after storage for indicated time: |  |  |  |  |
| Sample stored | Open | Sealed | Open | Sealed |
| Analysis, percent by wt.: |  |  |  |  |
| Total P₂O₅ | [2] 29.7 | [2] 30.0 | [3] 30.3 | [3] 30.1 |
| H₂O (Karl Fischer) | [2] 0.4 | [2] 0.6 | [3] 0.4 | [3] 0.8 |
| Percent of total P₂O₅ as polyphosphate | [2] 48 | [2] 48 | [3] 50 | [3] 49 |
| Prill strength [4] after storage for indicated time: |  |  |  |  |
| As made | C-0.5 | C-0.5 | C-2 | C-2 |
| 1 day | B-2 | B-1.5 | B-4 | B-4 |
| 3 days | B-2 | B-3 | A-7 | B-4 |
| 1 week |  |  | [5] A-8.5 | [5] A-4.5 |
| 2 weeks | A-7 | A-4.5 | A-7 | A-5 |
| 3 weeks | A-6 | A-3.5 | A-8 | A-4 |
| 4 weeks | A-5 | A-3 | A-8.5 | A-3.5 |

[1] Open samples stored in 10-dram bottles without caps; sealed samples stored with caps on.
[2] Storage time 1 week.
[3] Storage time 4 weeks.
[4] A=hard and brittle throughout; B=hard outer shell but plastic center; C=soft outer shell and plastic center. Number is average poundage required to crush ten −7 +8 mesh prills.
[5] After 10 days.

Solubility of urea-ammonium polyphosphate in oil

Tests were made to determine whether urea-ammonium polyphosphates are soluble in the SAE No. 10 motor oil used in the prilling reservoir. In the continuous tests made thus far, the prills have remained in the oil reservoir for about 1 to 2 minutes. In making the solubility tests, oil-prill mixtures (25 percent prills, 75 percent oil) were prepared with prills of 30–30–0 and 39–13–0 grades and placed in 250-milliliter volumetric flasks. The flasks were immersed in an oil bath (135° F.) and shaken gently throughout the 65-hour test period. After this time, the supernatant portion of the oil was decanted and analyzed for total N and $P_2O_5$.

Calculations based on analyses of the oil after the tests and on the assumption that the original oil contained no N or $P_2O_5$ indicated that less than 0.5 percent of either grade prill was solubilized. Analyses of the oils after the tests are tabulated below.

EXAMPLE V

|  | Prill grade used | |
| --- | --- | --- |
|  | 30-30-0 | 39-13-0 |
| Oil analysis, percent: | | |
| N | 0.03 | 0.04 |
| $P_2O_5$ | 0.04 | 0.03 |

In this series of tests, studies were made of the production of urea-ammonium polyphosphate of 36-18-0 grade (70 percent urea) by oil prilling a mixture of molten ammonium polyphosphate and 99.5 percent urea solution. Earlier exploratory batch tests [3] showed that product of this grade was hard when made and could be centrifuged at a high force. Continuous tests were made in the equipment described in Example II. SAE No. 10 weight motor oil was used as the prilling medium. Additional early strength data were obtained along with some information on the effect of centrifuging conditions on oil content. The oil temperature was controlled by circulating water through coils located in the prilling reservoir. Results of the tests are shown in Table VIII infra.

[3] Example I.

TABLE VIII
[Oil prilling of nominal 36-18-0 grade urea-ammonium polyphosphate]

|  | Test | |
| --- | --- | --- |
|  | OP-31-A | OP-33-B |
| Feed to prilling apparatus: [1] | | |
| Urea solution: [2] | | |
| Rate, g./min | 576 | 573 |
| Melter: | | |
| Temperature, °F | 300 | 300 |
| Retention time, min | 2 | 2 |
| Grade | 46.0-0-0 | 46.1-0-0 |
| $H_2O$ (Karl Fischer), percent by wt | 1.4 | 0.9 |
| Total N:biuret, wt. ratio | 26 | 21 |
| Ammonium polyphosphate: | | |
| Rate, g./min | 254 | 251 |
| Temperature at end of transfer line, °F | 330 | 330 |
| Grade | 15.8-61.1-0 | 15.6-61.2-0 |
| Lb. $NH_3$/unit $P_2O_5$ | 6.2 | 6.2 |
| Percent of total $P_2O_5$ as polyphosphate | 50 | 50 |
| $H_2O$ (Karl Fischer), percent by wt | 0.2 | 0.1 |
| Recycle fines: | | |
| Rate, g./min | 0 | 165 |
| Grade | | 36.0-18.3-0 |
| Percent of total $P_2O_5$ as polyphosphate | | 50 |
| Oil, percent by wt | | 1.5 |
| $H_2O$ (Karl Fischer), percent by wt | | 1.6 |
| Screen analysis (Tyler series), percent by wt.: | | |
| +12 mesh | | 7 |
| -12 +16 mesh | | 38 |
| -16 mesh | | 55 |
| Urea N plus biuret N:biuret, wt. ratio | | 13 |
| Prilling apparatus: [3] | | |
| Prilling cup: | | |
| Rotational speed, r.p.m | 400 | 400 |
| Discharge temperature, °F | | 270-280 |
| Oil vessel: | | |
| Oil [4] depth, in | 26 | 26 |
| Temperature, °F (start-finish) | 85-95 | 95-100 |
| $H_2O$ to cooling coils: | | |
| Gal./min | 2.8 | 2.8 |
| Temperature, °F (inlet-outlet) | 75-80 | 75-82 |
| Trommel discharge: | | |
| Temperature, °F | 85-95 | 95-100 |
| Screen analysis (Tyler series), percent by wt.: | | |
| +7 mesh | 12 | 5 |
| -7 +12 mesh | 78 | 73 |
| -12 mesh | 10 | 22 |
| Rate (oil-free basis), lb./hr | 110 | 120 |
| Prilled product: [5] | | |
| Composition, percent by wt.: | | |
| Total N | 35.4 | 34.3 |
| $NH_3$-N | 5.1 | 4.9 |
| Total $P_2O_5$ | 19.8 | 18.9 |
| $H_2O$ (Karl Fischer) | 1.4 | 1.4 |
| Oil | 0.6 | 0.9 |
| Biuret | 1.7 | 1.5 |
| Urea N plus biuret N:biuret, wt. ratio | 17 | 20 |
| Percent of total $P_2O_5$ as: | | |
| Orthophosphate | 53 | 51 |
| Polyphosphate | 47 | 49 |
| Percent of prill as ammonium polyphosphate | 35 | 37 |
| Lb. free $NH_3$/unit $P_2O_5$ | 6.2 | 6.3 |
| Bulk density, lb./cu. ft | 42 | 42 |

[1] Urea solution and molten ammonium polyphosphate mixed 6 inches from prilling cup in a trough. Recycle fines fed directly to cup.
[2] Made from prilled solid urea (46.5% N, 1.0% biuret, 0.1% $H_2O$) and water.
[3] Prilling cup was cylindrical shape (3- by 3-inch diameter) with 51 holes (3-mm. diameter) which were spaced in five rows around the cup. Oil reservoir was conical in shape (1½-in. diameter at bottom, 5-ft. diameter at top with sides angled at 45 degrees). Cooling coil was conical shaped and made of 80 linear feet of ½-inch-diameter tubing.
[4] SAE No. 10 weight motor oil.
[5] -7 +12 mesh prills after centrifuging 10 minutes at 1,400 G centrifugal force.

The equipment, in general, operated satisfactorily at a production rate of 130 pounds per hour over periods as long as 4 hours; this is about the maximum possible operating time during the day considering the time required for start-up and clean-up. The only operating difficulty encountered was occasional stoppages of the prilling cup. It was necessary to warm the cup with a torch about every half hour and to remove the cup for washing every hour or so.

Fresh prills, those made with recycle fines and without fines, could be centrifuged at a force of 1400 G without caking in the basket. The prills were hard and those made with addition of 1 pound of recycle fines per 5 pounds of melt were stronger than those made without fines (crushing strength of 1.5 vs. 1 lb.). On further storage in open containers for 3 weeks, the strength of both types of prills increased to 3 pounds. The oil content of the freshly made prills after centrifuging for 10 minutes at a force of 1400 G was 0.6 percent when no recycle was used and 0.9 percent when recycle was used. (The oil content of the recycle fines was 1.5 percent.) The bulk density of minus 7- plus 12-mesh prills was 42 pounds per cubic foot.

The oil content of prills made with added recycle fines was increased only slightly (to 1.1 percent) by decreasing the centrifugal time at 1400 G to 1 minute (see following tabulation). Increasing the time to 20 minutes decreased the oil content to 0.6 percent. When centrifuging was carried out at a lower force of 350 G, however, the products contained about twice as much oil.

| Time at indicated centrifugal force, min. | Oil content at indicated centrifugal force, percent by wt. | |
| --- | --- | --- |
|  | 350 | 1,400 |
| 1 | 2.3 | 1.1 |
| 5 | 2.0 | 0.9 |
| 10 | 1.4 | 0.9 |
| 20 | 1.1 | 0.6 |

Although the crushing strength of fresh prills as determined by our arbitrary strength procedure (Example II) has not varied significantly with grade (1–2 lb.), it was observed that prills of 36–18–0 grade were more brittle and could be centrifuged at a higher force than prills of 30–30–0 grade (50 percent urea). However, after aging in open containers for 1 to 3 weeks, the 30–30–0 grade prills were stronger (crushing strengths of about 7 and 3 lb., respectively).

What we claim as new and desire to secure by Letters Patent of the United States is:

1. A process for the production of strong solid granular high-analysis urea-ammonium polyphosphates eminently suitable as fertilizer materials which comprises the steps of:
 (1) combining and intimately mixing a stream of molten ammonium polyphosphate with a stream of concentrated urea solution in a mixing and delivery vessel, said concentrated urea solution containing at least 97 percent urea by weight;
 (2) discharging from said mixing and delivery vessel the resulting fluid mixture of urea and ammonium polyphosphate into droplet-forming means;
 (3) dividing the material in said droplet-forming means while in liquid form into drops and causing the drops to cool and solidify by subsequently allowing them to fall through a liquid medium contained in a vessel, said liquid medium being a mixture of oil, said oil derived from mineral origin, and at least 0.25 percent of Formalin solution, the pH of which has been adjusted to a range of 1–4 by the addition of sulfuric acid thereto;
 (4) withdrawing from the vessel containing said liquid medium the resulting cooled and solidified drops along with a portion of said liquid medium to separating means, wherefrom is recovered the granular urea-ammonium polyphosphate and wherefrom is recycled back to the liquid medium containing vessel substantially all of the liquid medium withdrawn therefrom;
said process characterized by the fact that the urea-ammonium polyphosphate granules recovered therefrom contain a skin of urea formaldehyde reaction product thereby increasing the initial crushing strength of said granules and substantially improving its storage properties.

2. A process for the production of strong crystalline granular high-analysis urea-ammonium polyphosphates eminently suitable as fertilizer materials, which comprises the steps of:
 (1) combining and intimately mixing a stream of molten ammonium polyphosphate with a stream of concentrated urea solution in a mixing and delivery vessel, wherein the temperature in said mixing and delivery vessel is maintained in the range from about 190° F. to about 325° F. and the residence time of the material therein is maintained in the range from about 2 minutes to about 0.01 minute, said concentrated urea solution containing at least 97 percent urea by weight, said ammonium polyphosphate containing in the range from about 25 percent to about 98 percent polyphosphate, expressed as percent of total $P_2O_5$, and the feed material constituent ratios, expressed as pounds of urea to pounds of ammonium polyphosphate is in the range from about 85:15 to about 25:75;
 (2) discharging from said mixing and delivery vessel the resulting fluid mixture of urea and ammonium polyphosphate into droplet-forming means wherein the temperature of said droplet-forming means is maintained in the range from about 190° F. to about 325° F. and the residence time of the material therein is in the range from about 2 minutes to about 0.01 minute;
 (3) dividing the material in said droplet-forming means while in liquid form into drops and causing the drops to cool and solidify by subsequently allowing them to fall through a liquid medium contained in a vessel, said liquid medium maintained at a temperature in the range from about 32° F. to about 175° F. and characterized by the fact that said urea-ammonium polyphosphate is substantially insoluble therein and substantially non-reactive therewith; and
 (4) withdrawing from the vessel containing said liquid medium the resulting cooled and solidified drops along with a portion of said liquid medium to separating means wherefrom is recovered the granular urea-ammonium polyphosphate and wherefrom is recycled back to the liquid medium-containing vessel substantially all of the liquid medium withdrawn therefrom.

3. The process of claim 2 wherein the concentration of the urea solution is in the range from about 99 percent by weight to about 99.5 percent by weight.

4. The process of claim 2 wherein the liquid medium is an oil of mineral origin.

5. A process for the production of strong crystalline granular high-analysis urea-ammonium polyphosphates eminently suitable as fertilizer materials, which comprises the steps of:
 (1) combining and intimately mixing a stream of molten ammonium polyphosphate with a stream of concentrated urea solution in a mixing and delivery vessel, wherein the temperature in said mixing and delivery vessel is maintained in the range from about 190° F. to about 325° F. and the residence time of the material therein is maintained in the range from about 2 minutes to about 0.01 minute, said concentrated urea solution containing at least 97 percent urea by weight, said ammonium polyphosphate containing in the range from about 25 percent to about 98 percent polyphosphate, expressed as percent of total $P_2O_5$, and the feed material constituent ratios, expressed as pounds of urea to pounds of ammonium polyphosphate, is in the range from about 85:15 to about 25:75;
 (2) discharging from said mixing and delivery vessel the resulting fluid mixture of urea and ammonium polyphosphate into droplet-forming means wherein the temperature of said droplet-forming means is maintained in the range from about 250° F. to about 300° F. and the residence time of the material therein is in the range from about 0.5 minute to about 0.01 minute;
 (3) dividing the material in said droplet-forming means while in liquid form into drops and causing the drops to cool and solidify by subsequently allowing them to fall through a liquid medium contained in a vessel, said liquid medium maintained at a temperature in the range from about 50° F. to about 125° F. and characterized by the fact that said urea-ammonium polyphosphate is substantially insoluble therein and substantially non-reactive therewith; and
 (4) withdrawing from the vessel containing said liquid medium the resulting cooled and solidified drops along with a portion of said liquid medium to separating means wherefrom is recovered the granular urea-ammonium polyphosphate and wherefrom is recycled back to the liquid medium-containing vessel substantially all of the liquid medium withdrawn therefrom.

6. A process for the production of strong crystalline granular high-analysis urea-ammonium polyphosphates eminently suitable as fertilizer materials, which comprises the steps of:
 (1) combining and intimately mixing a stream of molten ammonium polyphopshate with a stream of concentrated urea solution in a mixing and delivery vessel, wherein the temperature in said mixing and delivery vessel is maintained in the range from about 190° F. to about 325° F. and the residence time of the material therein is maintained in the range from about 2 minutes to about 0.01 minute, said concentrated urea solution containing at least 97 percent urea by weight, said ammonium polyphosphate containing in the range from about 25 percent to about 98 percent polyphosphate, expressed as percent of total $P_2O_5$, and the feed material constituent ratios, expressed as pounds of urea to pounds of ammonium polyphosphate, is in the range from from about 80:20 to about 50:50;
 (2) discharging from said mixing and delivery vessel the resulting fluid mixture of urea and ammonium polyphosphate into droplet-forming means wherein the temperature of said droplet-forming means is maintained in the range from about 190° F. to about 325° F. and the residence time of the material therein is in the range from about 2 minutes to about 0.01 minute;

(3) dividing the material in said droplet-forming means while in liquid form into drops and causing the drops to cool and solidify by subsequently allowing them to fall through a liquid medium contained in a vessel, said liquid medium maintained at a temperature in the range from about 32° F. to about 175° F. and characterized by the fact that said urea-ammonium polyphosphate is substantially insoluble therein and substantially non-reactive therewith; and (4) withdrawing from the vessel containing said liquid medium the resulting cooled and solidified drops along with a portion of said liquid medium to separating means wherefrom is recovered the granular urea-ammonium polyphosphate and wherefrom is recycled back to the liquid medium-containing vessel substantially all of the liquid medium withdrawn therefrom.

7. The process of claim 2 wherein the liquid medium is an oil selected from the group consisting of motor oil, metallurgical grade quenching oil, kerosene, mineral spirits, and mixtures thereof.

References Cited

UNITED STATES PATENTS

| | | | |
|---|---|---|---|
| 1,951,518 | 3/1934 | Meiser | 71—29 |
| 3,059,280 | 10/1962 | Laehder | 71—64 |
| 3,336,127 | 8/1967 | Hignett et al. | 71—51 |
| 3,353,949 | 11/1967 | Nau | 71—1 |
| 3,369,885 | 2/1968 | Takahashi et al. | 71—29 |

REUBEN FRIEDMAN, Primary Examiner

C. N. HART, Assistant Examiner

U.S. Cl. X.R.

71—29, 34, 64